W. C. MUNDORF.
ANTISKID DEVICE FOR VEHICLE WHEELS.
APPLICATION FILED MAR. 4, 1916.
1,253,626. Patented Jan. 15, 1918.
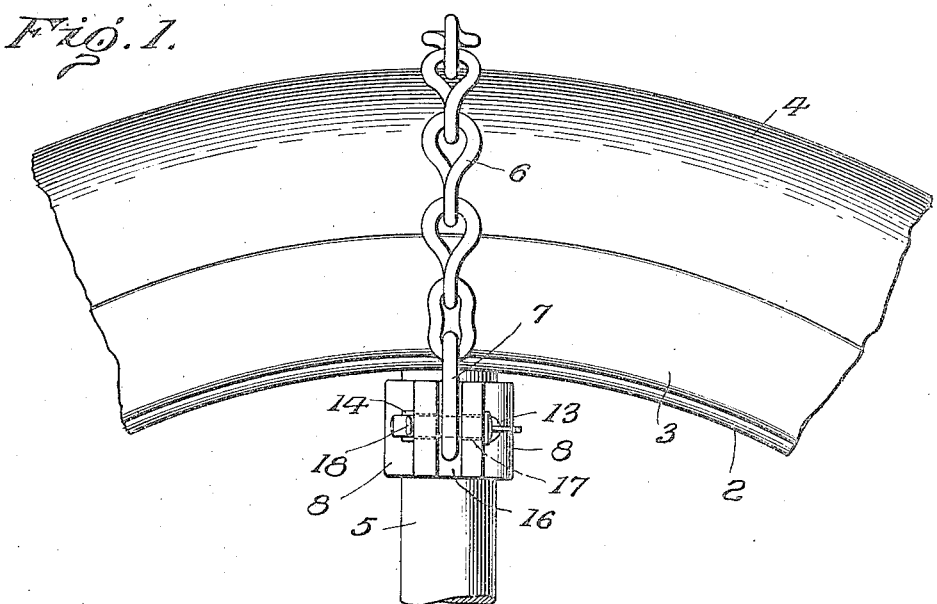
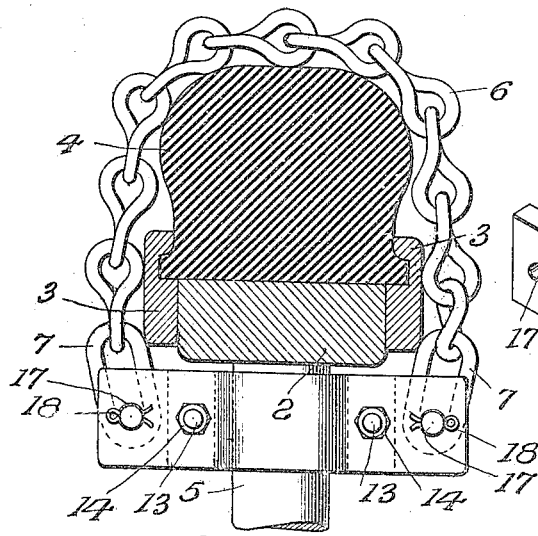
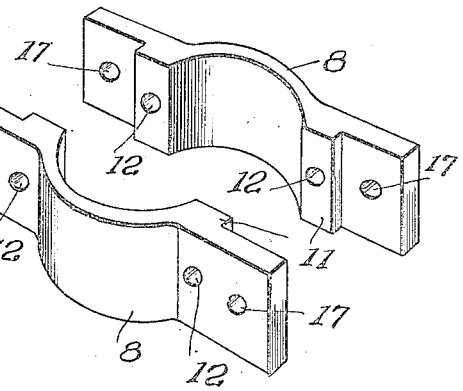
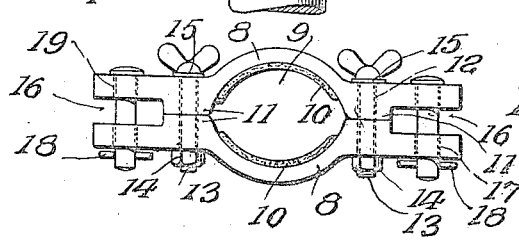
Inventor
W. C. Mundorf
By W. A. Redmond
Attorney

UNITED STATES PATENT OFFICE.

WILLIAM C. MUNDORF, OF YORK, PENNSYLVANIA.

ANTISKID DEVICE FOR VEHICLE-WHEELS.

1,253,626.

Specification of Letters Patent.

Patented Jan. 15, 1918.

Application filed March 4, 1916. Serial No. 82,015.

*To all whom it may concern:*

Be it known that I, WILLIAM C. MUNDORF, a citizen of the United States, residing at York, in the county of York and State of Pennsylvania, have invented a certain new and useful Antiskid Device for Vehicle-Wheels, of which the following is a specification.

This invention relates, generally to antiskid devices for vehicle wheels, and particularly to the means for securing such devices to the spokes of automobile wheels, and it has for its object to provide a fastening for such devices for attaching the same to vehicle wheels, of few parts, great strength and durability and comparatively inexpensive, it consists of the parts and combinations hereinafter described and claimed.

In the accompanying drawings forming a part of this specification,

Figure 1 is a side elevation of a portion of an automobile wheel showing my invention in position thereon.

Fig. 2 is a vertical transverse section of a wheel showing the invention in place.

Fig. 3 is a plan view of the clamp.

Fig. 4 is a perspective view of the clamp.

Similar numerals refer to similar parts in all the views.

Referring to the drawings the numeral 2 represents the felly of the wheel, 3 the rim, preferably of the clencher type; 4 a solid rubber tire, although the tire may be of pneumatic type if preferred. A spoke 5 is also shown in Figs. 1 and 2. The parts just described may be of the usual type, or any preferred suitable type, may be employed. The anti-skid chain 6 is formed of twisted links, with the exception of the end links 7 which, as shown, are straight links, for a purpose which will be hereinafter described.

The chain 6 is of the individual or single type and is not designed to be connected with its mates on the wheel.

For each chain used, a clamp is attached to one of the spokes of the wheel, said clamp consisting of two like or similar parts or halves 8, each of which is centrally curved outwardly to provide a concavity 9 to adapt it to fit the curve of the spoke, said concavity being provided with a lining 10 of any suitable material to prevent the defacing of the painted spoke to which it is attached and to increase the frictional adherence thereto of the clamp without injuring or marring the spoke in adjusting the clamp thereto. Said halves 8 are also formed with a shoulder 11 at each side or end of the concavity through which a bolt opening 12 is formed to receive a winged bolt 13 which is secured in position by a nut 14, thus locking the parts or halves 8 together and to the spoke and permitting of the adjustment thereof on the spoke. A lock washer 15 is interposed between the winged bolt head and the clamp.

The outer ends of the halves 8 are reduced in thickness relative to the thickness of the material at the shoulder 11, thus providing a space 16 at each end which forms a clevis to receive the end links 7 of the chain, each of said parts having an opening 19 to receive the headed pin 17 which is secured therein by a cotter pin 18, said pins 18 passing through the links 7 and holding the same securely in position.

It will be observed that any number of clamps may be employed, the number to be used being limited only by the number of spokes; and that each chain extends directly across the tire and is so secured as to render it almost impossible for the same to become accidentally detached or to work slack on the tire.

I am aware that it has been proposed to form a two part clamp with a hook at one end for one end of the chain. Such an arrangement, however, is a great disadvantage in adjusting the chain to secure the proper tension on the tire and if it is slack on the tire, it injuriously affects the same, while it greatly interferes with the efficiency of the chain as an anti-skid.

Having thus described my invention what I claim is:

A clamp comprising two like members each having a central concavity to receive the element clamped, a shoulder upon opposite sides of said concavity forming abutting surfaces when the clamp is in position, and reduced portions beyond said shoulders to form spaces between the ends of said members upon opposite sides of the clamp, clamping bolts passing through the shouldered portions of said members for securing the members of the clamp in clamping position, and removable pins passing through the spaced ends of said members to engage and connect an element extended between said spaced ends of the members to the clamp.

In testimony whereof, I affix my signature, in the presence of two witnesses.

WILLIAM C. MUNDORF.

Witnesses:
 GEO. W. MUNDORF,
 L. E. HERR.

Copies of this patent may be obtained for five cents each, by addressing the "Commissioner of Patents, Washington, D. C."